Figure 1:
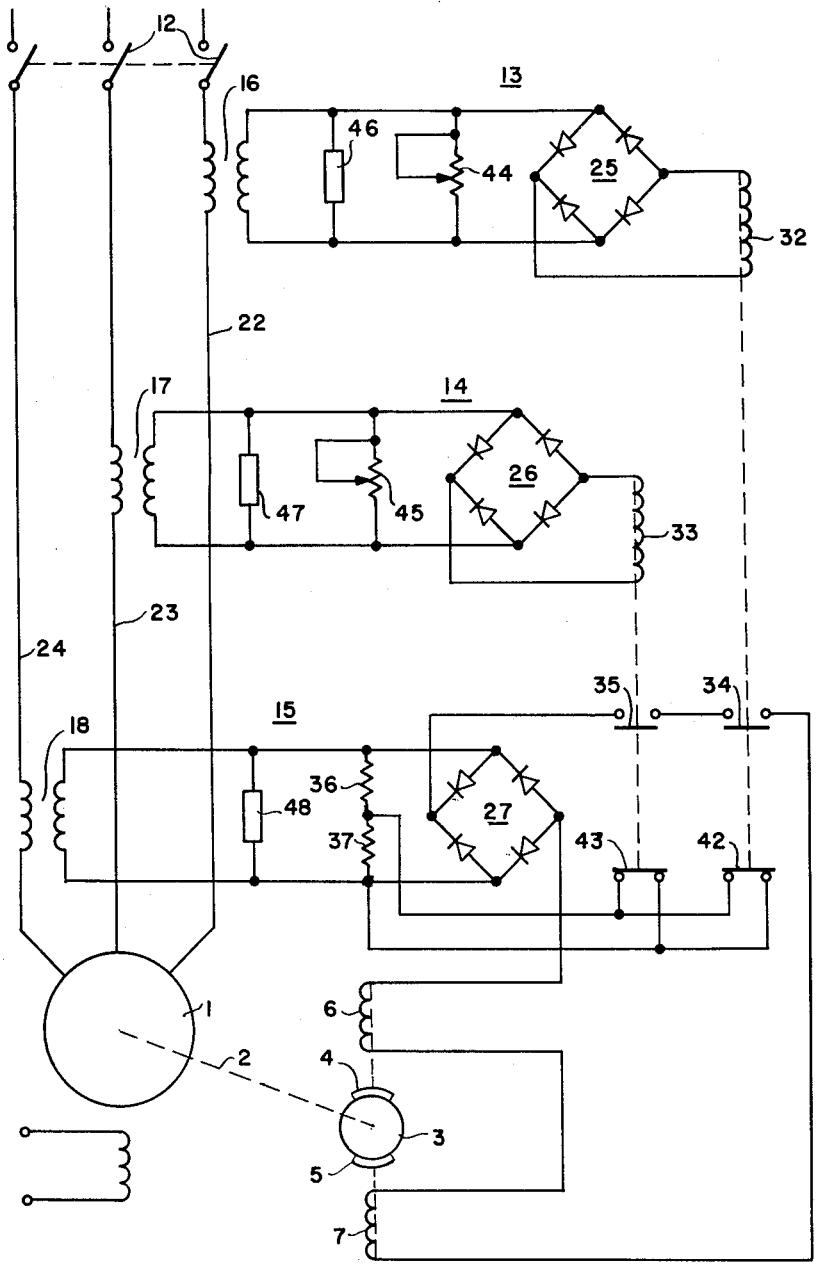

April 23, 1963 — M. BERMAN — 3,087,104

SERIES BRAKE SYSTEM FOR ALTERNATING CURRENT MOTORS

Filed June 12, 1961 — 2 Sheets-Sheet 1

INVENTOR.
Max Berman
BY
ATTORNEY

April 23, 1963 M. BERMAN 3,087,104
SERIES BRAKE SYSTEM FOR ALTERNATING CURRENT MOTORS
Filed June 12, 1961 2 Sheets-Sheet 2

INVENTOR.
Max Berman
BY *Merton D Morse*
ATTORNEY

United States Patent Office 3,087,104
Patented Apr. 23, 1963

3,087,104
SERIES BRAKE SYSTEM FOR ALTERNATING
CURRENT MOTORS
Max Berman, Roanoke, Va., assignor to General Electric
Company, a corporation of New York
Filed June 12, 1961, Ser. No. 116,608
7 Claims. (Cl. 318—367)

My invention relates to brake systems for alternating current motors and it has for its object to provide a practical electromagnetic brake for the rotor of such motors which is operated in response to the series current to the motor.

A further object of my invention is to provide such a brake system which employs an electromagnetic brake structure of the type commonly employed in direct current motor systems and which operates at low current values to apply and release the brake.

A further object of the invention is to provide such a brake system operative to release, and to apply, the brake in response to interruption, or initiation, of the series current to the motor and which is provided with means to hasten the action of the brake in effecting each such operation.

A further object of the invention is to provide such a system which fails safe, i.e., one in which the brake is applied in response to interruption of current in any phase of the motors.

In carrying my invention into effect, I employ a current transformer having a primary winding which may be a conductor extending through a hollow iron core, or a small number of turns, on an iron core, this primary being of heavy conductor in series with the motor to carry the entire load current of the motor. The transformer also has a secondary having a greater number of turns of smaller wire on the core, the turns being proportioned to produce a desired current transformation ratio. This winding is connected through a rectifier to the actuating winding of the brake through the contacts of a direct current contactor which may be energized from the same rectifier, or from another rectifier connected to a different phase of the motor current. The brake is of a standard low current pick up and drop out direct current type of any desired capacity.

Thus, upon energization of the motor the contactor attracts its armature closing the circuit to the brake magnets and causing the brake to be released. The contactor may be one the inductance of which is small relative to the inductance of the brake. Thus its drop out time is much shorter than the drop out time of the brake magnets would be were they connected directly to the output of the rectifier. Thus the relay hastens the application of the brake in response to interruption of current in the motor.

In accord with my invention, the contactor is also used to hasten the release of the brake when the motor is energized. To this end the contactor is used upon energization to interrupt, or to increase the resistance of, a shunt path across the input to the rectifier. Because of the high turns ratio of the current transformer the current in the secondary tends to maintain its previous value after this interruption, or increase in resistance, and thereby produces a voltage across the brake magnets which, because of the inductance of those magnets, has the form of a surge hastening the release of the brake.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawings in which FIG. 1 represents an embodiment of my invention and FIG. 2 represents a modification thereof.

Figure 2:
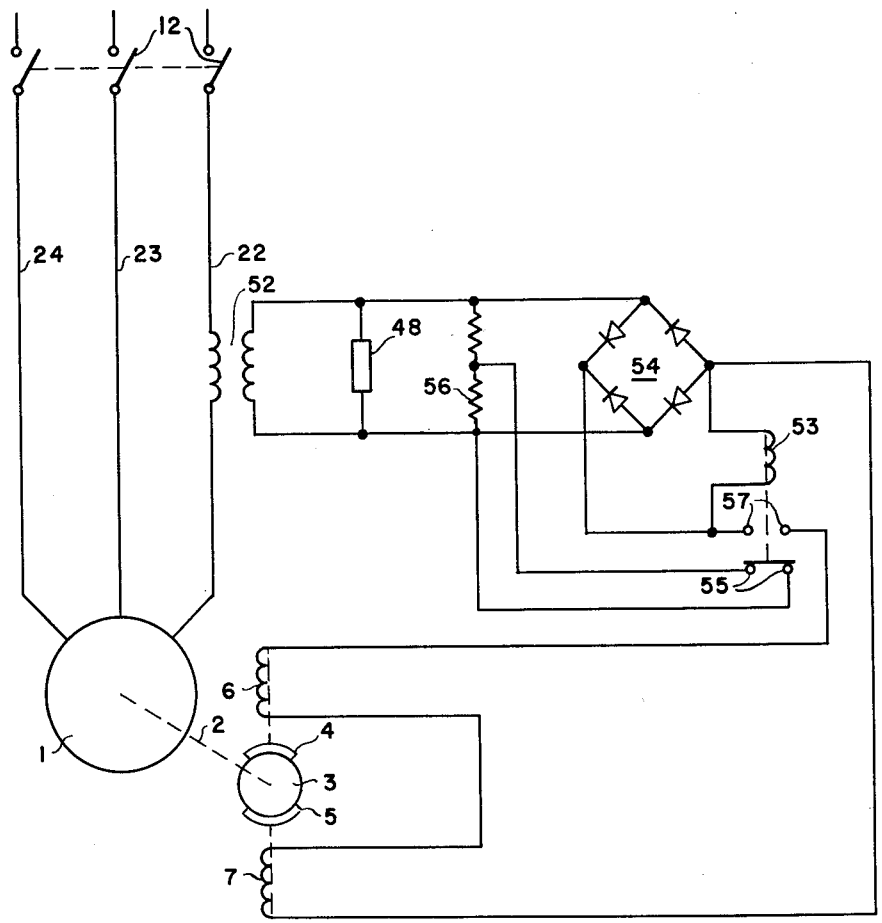

Referring first to FIG. 1 of the drawing, I have shown at 1 an alternating current motor having on the shaft 2 thereof a brake drum 3 engaged by brake shoes 4 and 5 when the motor is deenergized. These shoes may be disengaged from the drum 3 when the motor is energized by energization of electromagnets 6 and 7, which attract the armatures to which the brake shoes are attached. The normal engagement of brake shoes 4 and 5 with the drum 3 when the motor and brake magnets 6 and 7 are deenergized is effected by the usual mechanical biasing means, usually employing spring action biasing the shoes 4 and 5 against the drum.

The motor is arranged to be energized, by closure of a switch 12, from any suitable source not illustrated on the drawing. When so energized equipments 13, 14 and 15 operate to effect the energization of the magnets 6 and 7 to cause the withdrawal, or release, of the brake shoes 4 and 5 from the drum 3.

Each of these equipments comprises a current transformer 16, 17, 18, respectively, each of which has a primary connected in series with conductors 22, 23, 24, respectively, leading to the motor. These transformers are of the current transformer type; that is, they have, as above-indicated, a small number of primary turns, or even a partial turn, of heavy wire wound on or passed through an iron core to carry the load current of the motor, and a secondary winding having a larger number of turns of smaller wire on said core. The voltage of each secondary is suplied to a corresponding rectifier 25, 26, 27 by which it is rectified and employed to energize the windings of contactors 32 and 33, in the case of equipments 13 and 14, which relays attract their armatures 34 and 35, respectively, to close a circuit from the rectifier 27 of the other equipment 15, to the electromagnets 6 and 7 thereby to cause withdrawal of the brake shoes 4 and 5.

Across the circuit extending from the secondary of transformer 18 to the rectifier 27 is a resistor 36 in series with the resistor 37, the latter of which is normally short circuited by contacts 42 and 43 of relays 32 and 33, respectively. Thus, when relays 32 and 33 both operate, this short circuit is broken thereby inserting resistance 37 in series with resistance 36, thereby to increase the shunt resistance across the rectifier 27. This increase in resistance tends, by reason of the tendency of the transformer to maintain its former value of secondary current, to increase the voltage supplied across the rectifier 27, thereby considerably increasing the voltage applied to the electromagnets 6 and 7, and causing more rapid attraction of the brake shoes and the release of the rotor for rotation. The motor is thus free to rotate to drive any suitable load.

This form of the invention has the important advantage that should an interruption in current occur in any phase of the motor, the brake is immediately applied to the drum 3 under the influence of its mechanical bias. This advantage is not obtained in systems in which the control voltage is derived through means such as transformers connected between phases. Thus, with my invention, should interruption of current occur in phase 22 or 23, the corresponding relay 32 or 33 deenergizes, opening the brake magnet circuit at contacts 34 or 35. Should the interruption occur in phase 24, voltage supplied to the rectifier 27 fails thereby deenergizing the electromagnets of the brake causing the brake to be applied.

Each secondary winding on transformer 16 and 17 is also shunted by a variable resistance 44 and 45 which may be adjusted to establish a desired pick up and drop out voltage for the relays 32 and 33.

Also in shunt with all of the secondary windings of the transformers 16, 17 and 18 are resistors 46, 47 and 48. These resistors are of the thyrite type, having a negative co-efficient of resistances; that is, its resistance reduces with increase in applied voltage. These resistances are employed as protective resistances for the rectifiers 25, 26 and 27 and serve to limit voltages caused by power surges in the respective phase to transients of such magnitude as not to cause injury to the rectifiers.

The structure of FIG. 2 is similar to that of FIG. 1 but only one transformer 52 is used having its primary connected in series with a single phase of the motor. Also, but one relay 53 is employed, that relay being connected to the output of the rectifier 54 to which voltage is supplied from the secondary winding of the transformer 52. This relay, when energized, operates its armature 55 which normally short circuits resistance 56 to its upper position in which it opens this short circuit and closes contact 57, thereby connecting the electromagnets 6 and 7 across the rectifier, thereby to energize those magnets and cause the brake shoes to be withdrawn from the brake drum. The interruption of the short circuits across resistances 5 and 6 operates as in FIG. 1, to increase the resistance in shunt to the secondary of the transformer, thereby to cause an increased voltage to be applied momentarily to the rectifier and to the electromagnets 4 and 5 to hasten the action of those magnets in releasing the drum.

In both forms of my invention the contactors 32, 33, or 53, because of their lower inductance, drop out much quicker in response to interruption of current in the corresponding phase of the motor circuit than would the brake magnets were they connected directly to the output of the rectifier. Thus the inclusion of the contactors hastens the application of the brake.

Both forms of the invention are advantageous in reactor crane control systems; for example, that is, systems in which the speed of the crane motor is controlled by reactors in the primary circuit of the motor, because the current transformers may be located near the motors and thereby dispense with the need for additional collectors to transmit power to operate the brakes.

Series brake systems in accord with my invention are practical and advantageous when used in connection with motors of a wide range of power ratings, including those of high power necessitating contactors and brake actuating magnets of substantial direct current carrying capacity. Connected and operated as described, the system has the advantage of rapid response both to release and to apply the brake, combined with the advantage of failing safe; i.e., applying the brake in response to interruption of current in any phase of the motor.

While I have shown a particular embodiment of my invention it will, of course, be understood that I do not wish to be limited thereto since different modifications both in the circuits and in the instrumentalities may be made and I contemplate in the appended claims to cover any such modifications as fall within the true spirit and scope of my invention.

What I claim as new and desire to secure by Letters Patent of the United States is:

1. The combination, in a brake system for an alternating current motor, of a brake having an electromagnet for actuation thereof, a rectifier, a current transformer having a primary, means to connect said primary in series with an alternating current supply circuit for the motor and a secondary connected through said rectifier to the actuating electromagnet of said said brake, and a relay having a winding, means for energizing said winding in response to series current flowing in the supply circuit and said relay having contacts connected to said electromagnet and to the output of said rectifier to release said brake when said winding is energized and when deenergized to interrupt said connection between said electromagnet and said rectifier thereby to apply said brake.

2. In a brake system for an alternating current motor, the combination of a brake having an electromagnet for actuation thereof, a rectifier, a current transformer having a primary, means to connect said primary in series with an alternating current supply circuit for the motor and a secondary connected through said rectifier to said actuating electromagnet of said brake, thereby to release said brake from said shaft when said motor is energized, and a relay having a winding of lower reactance than said actuating electromagnet connected to be energized in response to current flowing in the supply circuit and to be deenergized in response to interruption thereof, said relay having armature contacts in series with said electromagnet to deenergize said electromagnet in response to deenergization of said lower reactance winding thereby to hasten the application of said brake.

3. The combination in a brake system for an alternating current motor, of a brake having an electromagnet for actuation thereof, a rectifier, a current transformer having a primary, means to connect said primary in series with an alternating current supply circuit for the motor and a secondary connected through said rectifier to the actuating electromagnet of said brake, and a relay having a winding connected to be energized in response to series current flowing in the supply circuit and when energized to connect said actuating electromagnet to the output of said rectifier thereby to release said brake and when deenergized to interrupt said connection thereby to apply said brake, a resistance path in shunt to said secondary, and means to increase the resistance of said path in response to energization of said relay whereby the tendency of said current transformer to maintain its secondary current produces increased voltage across said actuating electromagnet hastening the release of said brake.

4. In a brake system for an alternating current motor, the combination of a brake, said brake having an actuating electromagnet, a rectifier, a current transformer having a primary, means to connect said primary in series with a current supply circuit for the motor and a secondary connected through said rectifier to said electromagnet, a switch in series with said electromagnet, and means responsive to interruption of current in said secondary to open said switch.

5. In a brake system for an alternating current motor, the combination of a brake, said brake having an actuating electromagnet, a rectifier, a current transformer having a primary, means to connect said primary in series with a current supply circuit for the motor and a secondary connected through said rectifier to said electromagnet, a resistive path in shunt to said secondary, a switch in series with said electromagnet, and means responsive to current in said secondary to close said switch and to increase the resistance of said path.

6. In a brake system for a polyphase alternating current motor, the combination of a pair of current transformers, each having a primary means to connect each said primary in series with a respective phase of a supply circuit for the motor and each having a secondary connected to supply alternating voltage to the input of a respecive rectifier, a relay having a winding connected across the output of one of said rectifiers and having a pair of contacts, a brake for the driven member of said motor, said brake having an actuating electromagnet connected through said contacts to the output of the other of said rectifiers.

7. In a brake system for a polyphase alternating current motor, the combination of a pair of current transformers each having a a primary, means to connect each said primary in series with a respective phase of a supply circuit for the motor and each having a secondary connected to supply alternating voltage to the input of a respective rectifier, a relay having a winding connected across the output of one of said rectifiers, a brake for the driven member of said motor, said brake having an actuating electromagnet, and means responsive to energizing of said relay to connect said actuating electromagnet across the output of the other of said rectifiers, whereby said actuating electromagnet is energized in response to current in said two phases and is deenergized in response to interruption of current in either of said phases.

References Cited in the file of this patent

UNITED STATES PATENTS 2,121,889   Sousedik _____ June 28, 1938

FOREIGN PATENTS 566,404   Great Britain _____ Dec. 28, 1944